(12) United States Patent
Schmidt et al.

(10) Patent No.: US 12,473,496 B2
(45) Date of Patent: Nov. 18, 2025

(54) PROCESSES FOR TRANSPORTING WASTE PLASTICS TO A REFINERY PROCESSING UNIT

(71) Applicant: Chevron U.S.A. Inc., San Ramon, CA (US)

(72) Inventors: Joel Edward Schmidt, Oakland, CA (US); Tengfei Liu, Fairfield, CA (US); Robert E. Montgomery, Moss Point, MS (US); Richard L. Grove, Spanish Fort, AL (US); Thomas Michael Porritt, Ocean Springs, MS (US); Hye-Kyung Cho Timken, Albany, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 203 days.

(21) Appl. No.: 18/530,685

(22) Filed: Dec. 6, 2023

(65) Prior Publication Data
US 2025/0188360 A1     Jun. 12, 2025

(51) Int. Cl.
*C10G 1/10*     (2006.01)
*C10G 1/04*     (2006.01)
*C10G 11/00*    (2006.01)

(52) U.S. Cl.
CPC ............. *C10G 1/10* (2013.01); *C10G 1/04* (2013.01); *C10G 11/00* (2013.01); *C10G 2300/1003* (2013.01); *C10G 2300/1044* (2013.01); *C10G 2400/02* (2013.01); *C10G 2400/20* (2013.01); *C10G 2400/30* (2013.01)

(58) Field of Classification Search
CPC . C10G 1/10; C10G 1/04; C10G 11/00; C10G 2300/1003; C10G 2300/1044; C10G 2400/02; C10G 2400/20; C10G 2400/30; C10G 2300/1014; C10G 11/182; C10G 51/026; C10G 1/002; B01J 29/084; B01J 29/40
See application file for complete search history.

(56) References Cited

U.S. PATENT DOCUMENTS

| 11,104,851 | B2 | 8/2021 | Koseoglu et al. |
| 2020/0362248 | A1* | 11/2020 | Cartolano ............. C10B 57/06 |
| 2021/0301145 | A1* | 9/2021 | Gauthier ................ C10G 1/04 |
| 2022/0184855 | A1* | 6/2022 | Mleczko ............... C10B 49/10 |
| 2023/0183582 | A1 | 6/2023 | Basha et al. |

(Continued)

FOREIGN PATENT DOCUMENTS

EP     3878926 A1 *   9/2021   ............. C10G 1/10

OTHER PUBLICATIONS

PCT/US2024/042259, International Search Report, Nov. 14, 2024, 5 pages.

*Primary Examiner* — Ali Z Fadhel
(74) *Attorney, Agent, or Firm* — Michael E. Carmen; Terrence M. Flaherty

(57) ABSTRACT

A continuous process for transporting a waste plastic feedstock to a refinery processing unit, includes forming a solution containing (i) about 1 to about 40 wt. %, based on the total weight of the solution, of one or more waste plastic feedstocks and (ii) a recycled inert carrier fluid received from a refinery processing unit, and processing the solution comprising the one or more waste plastic feedstocks and the recycled inert carrier fluid in the presence of a catalyst under catalytic cracking conditions.

20 Claims, 3 Drawing Sheets

(56) References Cited

U.S. PATENT DOCUMENTS

| | | | |
|---|---|---|---|
| 2023/0257664 A1* | 8/2023 | Sattler | C10G 1/002 585/241 |
| 2023/0312437 A1* | 10/2023 | Schmidt | C08J 11/20 521/47 |
| 2023/0407190 A1* | 12/2023 | Narayanaswamy | C10G 47/16 |
| 2025/0136873 A1* | 5/2025 | Anderson | C10G 1/10 |

* cited by examiner

PROCESSES FOR TRANSPORTING WASTE PLASTICS TO A REFINERY PROCESSING UNIT

BACKGROUND

The world has seen extremely rapid growth of plastics production. According to Plastics Europe Market Research Group, the world plastics production was 335 million tons in 2016, 348 million tons in 2017, 359 million tons in 2018, and 367 million tons in 2020. According to Mckinsey & Company, the global plastics-waste volume is estimated to be 460 million tons per year by 2030 if the current trajectory continues.

Single use waste plastic has become an increasingly important environmental issue. At the moment, there appear to be few options for recycling waste plastics such as, for example, polyethylene and polypropylene waste plastics, to value-added chemical and fuel products. Presently, only a small amount of polyethylene/polypropylene waste plastic is recycled via chemical recycling, where recycled and cleaned plastic pellets are pyrolyzed in a pyrolysis unit to make fuels (naphtha, diesel), steam cracker feed or slack wax. The majority, greater than 80%, is incinerated, land filled or discarded.

SUMMARY

In accordance with an illustrative embodiment, a continuous process for transporting a waste plastic feedstock to a refinery processing unit, comprises:
  forming a solution comprising (i) about 1 to about 40 wt. %, based on the total weight of the solution, of one or more waste plastic feedstocks and (ii) a recycled inert carrier fluid received from a refinery processing unit, and
  processing the solution comprising the one or more waste plastic feedstocks and the recycled inert carrier fluid in the presence of a catalyst under catalytic cracking conditions.

In accordance with another illustrative embodiment, a continuous process for transporting a waste plastic feedstock to a refinery processing unit, comprises:
  processing a first solution comprising (i) about 1 to about 40 wt. %, based on the total weight of the solution, of one or more first waste plastic feedstocks and (ii) a recycled inert carrier fluid received from a refinery processing unit in the presence of a catalyst under catalytic cracking conditions,
  separating the recycled inert carrier fluid from the processed first solution, and
  forming a second solution comprising (i) about 1 to about 40 wt. %, based on the total weight of the solution, of one or more second waste plastic feedstocks and (ii) the separated recycled inert carrier fluid.

BRIEF DESCRIPTION OF THE DRAWINGS

In combination with the accompanying drawing and with reference to the following detailed description, the features, advantages, and other aspects of the implementations of the present disclosure will become more apparent, and several implementations of the present disclosure are illustrated herein by way of example but not limitation. In the accompanying drawings.

DETAILED DESCRIPTION

Figure 1:
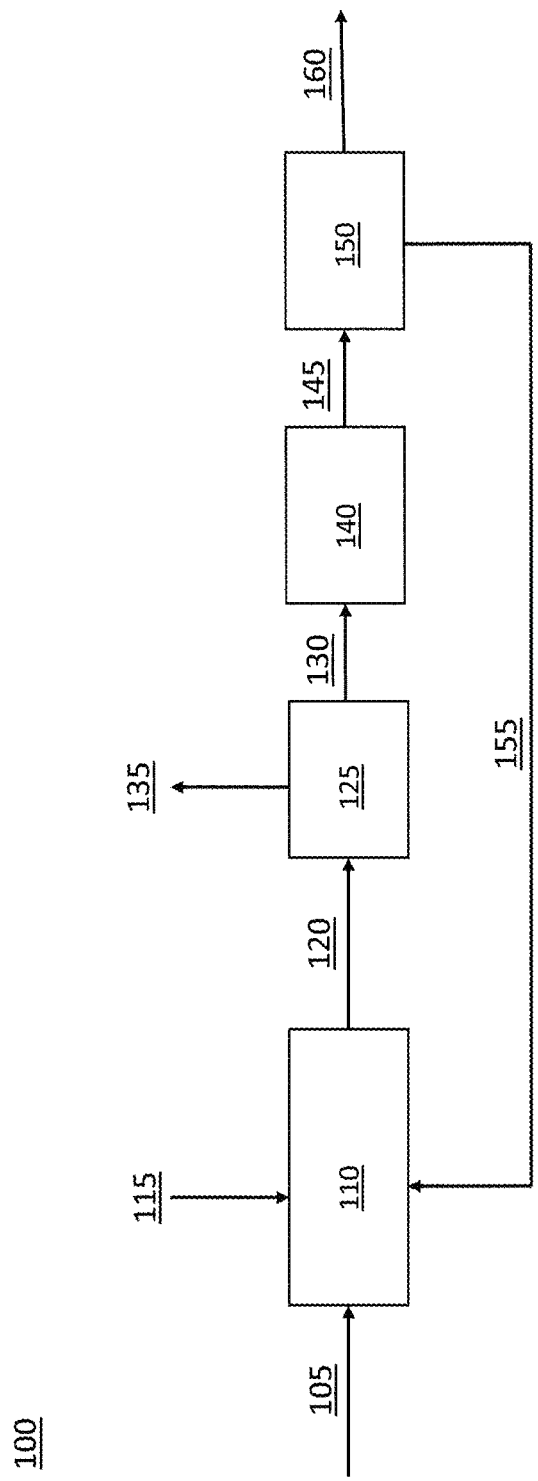
FIG. 1 illustrates a schematic diagram of a continuous process for sending a solution of one or more waste plastic feedstocks and a recycled inert carrier fluid to a refinery processing unit, according to an illustrative embodiment.

Various illustrative embodiments described herein are directed to continuous processes for transporting a waste plastic feedstock to a refinery processing unit using a recycled inert carrier fluid. As mentioned above, waste plastic has become an increasingly important environmental issue. Plastics are inexpensive, easy to mold, and lightweight with many commercial applications. Once the plastic products have outlived their useful lives, they are generally sent to waste disposal such as landfill sites, adding to serious environmental problems, like land, water, and air pollution or recycled by reprocessing the waste into raw material for reuse. In addition, the disposal costs for the post-industrial plastic waste poses an extra burden on processors and manufacturers. Also, there is the consideration that a high demand to produce more virgin resin material places a burden on an already limited and depleting natural resource.

The use of post-industrial and post-consumer polymers ("plastic waste") through recycling has a variety of benefits over producing virgin resin. Unfortunately, while the economic and environmental demand for products made from recycled plastic exists, the added value created by conventional recycling methods is comparatively low. As a result, large amounts of used plastics can be only partially returned to the economic cycle. Moreover, conventional methods of recycling plastics tend to produce products with lower quality properties. For example, present methods of chemical recycling such as via pyrolysis cannot make a big impact for the plastics industry. The current pyrolysis operation produces poor quality fuel components (naphtha and diesel range products), but the quantity is small enough that these products can be blended into fuel supplies. However, this simple blending cannot continue if we have to recycle very large volumes of waste polyethylene and polypropylene to address the environmental issues. The products produced from the pyrolysis unit have too poor quality to be blended in large amounts (for example, 5 to 20 vol. % blending) in transportation fuels.

Waste plastics have been fed to a fluid catalytic cracking unit using a feed solvent such as a vacuum gas oil (VGO) or atmospheric tower bottoms (ATBs). However, these solvents have drawbacks such as a limited ability to dissolve the waste plastic as well as forming a product with high pour point and high viscosity.

The illustrative embodiments described herein overcome these and other drawbacks by providing processes for transporting a waste plastic feedstock to a refinery processing unit using a recycled inert carrier fluid resulting in a hydrocarbon product with a lower carbon footprint than the corresponding hydrocarbon product produced from a petroleum-based feedstock. Among other factors, it has been found that the recycled inert carrier fluid described herein is not extensively cracked (i.e., converted) in the refinery processing unit as compared to the waste plastic feedstocks thus allowing it to more easily transport the waste plastic feedstocks as well as to be recycled back to the blending unit and reused for transporting other waste plastic feedstocks. In addition, by separating the recycled inert carrier fluid from the refinery processing unit effluent, the recycled inert carrier fluid can be continuously recycled back to a blending unit where it can more easily dissolve incoming waste plastic feedstocks in a continuous process resulting in a thermal energy savings. Further, the recycled inert carrier fluid will exit the refinery processing unit at an elevated temperature such that it can more easily dissolve the waste plastic feedstocks during blending. Accordingly, positive economics are realized for the overall continuous process from using the recycled inert carrier fluid in converting recycled waste plastics to a chemical or fuel product.

Pyrolysis produces a significant amount of light product from the plastic waste, about 10 to 30 wt. %, and about 5 to 10 wt. % of char. These light hydrocarbons are used as fuel to operate the pyrolysis plant, as mentioned above. Thus, the liquid hydrocarbon yield from the pyrolysis plant is at most 70 to 80%. To the contrary, the use of the present waste plastic/inert carrier fluid solution significantly increases the overall hydrocarbon yield obtained from the waste plastic. In some instances, the hydrocarbon yield using the present solution can be as much as 98%.

Definitions

As used in this disclosure the word "comprises" or "comprising" is intended as an open-ended transition meaning the inclusion of the named elements, but not necessarily excluding other unnamed elements. The phrase "consists essentially of" or "consisting essentially of" is intended to mean the exclusion of other elements of any essential significance to the composition. The phrase "consisting of" or "consists of" is intended as a transition meaning the exclusion of all but the recited elements with the exception of only minor traces of impurities.

The terms "a," "an," and "the" are intended to include plural alternatives, e.g., at least one. The terms "including," "with," and "having," as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about," from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

The term "continuous" as used herein shall be understood to mean a system that operates without interruption or cessation for a period of time, such as where reactant(s) and catalyst(s) are continually fed into a reaction zone and products are continually or regularly withdrawn without stopping the reaction in the reaction zone.

The term "virgin" denotes the newly produced materials and/or objects prior to their first use, which have not already been recycled.

The term "equilibrium catalyst" or "ECAT" is used herein to indicate the inventory of circulating fluid cracking catalyst composition in an FCC unit operating under catalytic cracking conditions. For purpose of this disclosure, the terms "equilibrium catalyst," "spent catalyst" (catalyst taken from an FCC unit) and "regenerated catalyst" (catalyst leaving a regeneration unit) shall be deemed equivalent.

A "fresh catalyst" as used herein denotes a catalyst which has not previously been used in a catalytic process.

A "spent catalyst" as used herein denotes a catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, steam or hydrothermal deactivation, metals (and ash) sorption or accumulation, attrition, morphological changes including changes in pore sizes, cation or anion substitution, and/or chemical or compositional changes.

A "regenerated catalyst" as used herein denotes a catalyst that had become spent, as defined above, and was then subjected to a process that increased its activity to a level greater than it had as a spent catalyst. This may involve, for example, reversing transformations or removing contaminants outlined above as possible causes of reduced activity. The regenerated catalyst typically has an activity that is equal to or less than the fresh catalyst activity.

The term "steady state" as used herein is used herein to indicate operating conditions within an FCC reactor unit wherein there exists within the unit a constant amount of catalyst inventory having a constant catalyst activity at a constant rate of feed of a feedstock having a defined composition to obtain a constant conversion rate of products.

The term "catalyst activity" as used herein can be determined on a weight percent basis of conversion of a standard feedstock at standard FCC conditions by the catalyst microactivity test in accordance with ASTM D3907.

The term "upgrade" or "upgrading" generally means to improve quality and/or properties of a stream and is meant to include physical and/or chemical changes to a stream. Further, upgrading is intended to encompass removing impurities (e.g., heteroatoms, metals, etc.) from, for example, a hydrocarbon stream, converting a portion of the hydrocarbons into shorter chain length hydrocarbons, cleaving single ring or multi-ring aromatic compounds present in a hydrocarbon stream, and/or reducing viscosity of a hydrocarbon stream.

The term "octane number" refers to the percentage of iso-octane in a mixture of iso-octane and n-heptane that would have the same knock resistance as the presently tested fuel, according to ASTM D2699 and D2700. Octane numbers typically range from 0 to 100, with higher values indicating better fuel performance. Octane numbers are unitless.

The term "Research Octane Number" (RON) refers to the octane number obtained by testing at lower engine speed and temperature, typically about 600 rpm, according to ASTM D2699.

The term "Motor Octane Number" (MON) refers to the octane number obtained by testing at higher engine speed and temperature, typically about 900 rpm according to ASTM D2700. Given that engine inefficiency inherently increases as temperature increases, RON is typically higher than MON.

"Anti-knock index" is defined by the arithmetic average of the two octane numbers: (RON+MON)/2.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

Although any processes and materials similar or equivalent to those described herein can be used in the practice or testing of the illustrative embodiments described herein, the typical processes and materials are herein described.

The illustrative embodiments of the present disclosure will be specifically described below with reference to the accompanying drawings. For the purpose of clarity, some steps leading up to the separation of the cracked waste plastic feedstocks and recycled inert carrier fluid as illustrated in FIG. 1 are omitted. In other words, one or more well-known processing steps which are not illustrated but are well-known to those of ordinary skill in the art have not been included in the figures. This is not intended to be interpreted as a limitation of any particular embodiment, or illustration, or scope of the claims.

FIG. 1 illustrates a continuous process as described herein that can be implemented using the system 100. As will be appreciated by one of skill in the art, components of the system can be in fluid communication with each other through any suitable conduits (e.g., pipes, streams, etc.). For ease of understanding, specific examples mentioned in the following description are all illustrative and are not used to limit the protection scope of the present disclosure.

The system 100 first includes blending unit 110 for receiving one or more waste plastic feedstocks 105 and recycled inert carrier fluid 155. Blending unit 110 can be any conventional unit for receiving one or more waste plastic feedstocks 105 and recycled inert carrier fluid 155 to form solution stream 120.

As used herein, a "waste plastic" refers to any post-industrial (or pre-consumer) and post-consumer plastics, such as, for example, one or more polyesters, one or more polyolefins (PO), and/or polyvinylchloride (PVC). As used herein, a "post-consumer plastic" is one that has been used at least once for its intended application for any duration of time regardless of wear, has been sold to an end use customer, or has been discarded into a recycle bin by any person or entity other than a manufacturer or business engaged in the manufacture or sale of the material. A "post-industrial plastic" (or "pre-consumer" plastic) includes all manufactured recyclable organic plastics that are not post-consumer plastics, such as a material that has been created or processed by a manufacturer and has not been used for its intended application, has not been sold to the end use customer, or has been discarded or transferred by a manufacturer or any other entity engaged in the sale or disposal of the material. Examples of post-industrial or pre-consumer plastics include rework, regrind, scrap, trim, out of specification materials, and finished materials transferred from a manufacturer to any downstream customer (e.g., manufacturer to wholesaler to distributor) but not yet used or sold to the end use customer.

The waste plastic may originate from one or more of several sources. In an illustrative embodiment, as may be combined with one or more of the preceding paragraphs, the waste plastic may originate from, for example, plastic bottles, diapers, eyeglass frames, films, packaging materials, carpet (residential, commercial, and/or automotive), textiles (clothing and other fabrics) and combinations thereof. This list is merely illustrative, and any source of waste plastic is contemplated herein.

In an illustrative embodiment, as may be combined with one or more of the preceding paragraphs, a waste plastic includes, for example, a low melting point polyethylene (LMPPE). In an illustrative embodiment, a low melting point polyethylene has a melting point of less than about 100° C. In an illustrative embodiment, a low melting point polyethylene has a melting point of from about 35° C. to about 100° C. In an illustrative embodiment, a low melting point polyethylene has a melting point of from about 40° C. to about 80° C. In an illustrative embodiment, a low melting point polyethylene has a melting point of from about 45° C. to about 60° C. In an illustrative embodiment, a low melting point polyethylene has a melting point of from about 60° C. to about 70° C. The melting point of the low melting point polyethylene can be determined by differential scanning calorimetry (DSC).

In an illustrative embodiment, as may be combined with one or more of the preceding paragraphs, a waste plastic includes, for example, high-density polyethylene (HDPE), low-density polyethylene (LDPE), high molecular weight polyethylene (HMWPE), low molecular weight polyethylene (LMWPE), polypropylene (PP), polystyrene (PS) and mixed plastics, e.g., a mixture of polyethylene (PE), polypropylene (PP), and polystyrene (PS) or a mixture of LDPE, HDPE and PP.

In an illustrative embodiment, a high-density polyethylene has a number average molecular weight of about 100,000 to about 250,000. In an illustrative embodiment, an ultra-high molecular weight polyethylene can have a number average molecular weight of at least about 500,000. In an illustrative embodiment, a high molecular weight polyethylene can have a number average molecular weight of from about 50,000 to about 400,000. In an illustrative embodiment, a low molecular weight polyethylene can have a number average molecular weight of from about 5,000 to about 50,000. In an illustrative embodiment, a high molecular weight polypropylene can have a number average molecular weight of from about 100,000 to about 700,000. In an illustrative embodiment, a high molecular weight polypropylene can have a weight average molecular weight of from about 220,000 to about 700,000. In an illustrative embodiment, a low molecular weight polypropylene can have a number average molecular weight of from about 10,000 to about 100,000.

In an illustrative embodiment, as may be combined with one or more of the preceding paragraphs, the one or more waste plastic feedstocks can comprise at least about 50, or at least about 55, or at least about 60, or at least about 65, or at least about 70, or at least about 75, or at least about 80, or at least about 85, or at least about 95, or at least about 99 weight percent of, for example, polyolefins such as high-density polyethylene (HDPE), low-density polyethylene (LDPE), ultra-high molecular weight polyethylene, and polypropylene (PP), polyvinyl chloride (PVC), polyvinylidene chloride (PVDC), polyesters such as polyethylene terephthalate (PET), copolyesters and terephthalate copolyesters (e.g., containing residues of TMCD, CHDM, propylene glycol, or NPG monomers), polyamides, poly(methyl methacrylate), polytetrafluoroethylene, acrylonitrile-butadiene-styrene (ABS), polyurethanes, cellulose and derivatives thereof (e.g., cellulose diacetate, cellulose triacetate, or regenerated cellulose), epoxy, phenolic resins, polyacetal, polycarbonates, polyphenylene-based alloys, polystyrene, styrenic compounds, vinyl based compounds, styrene acrylonitrile, polyvinyl acetals (e.g., PVB), urea based polymers, melamine containing polymers, thermosetting, thermoplastic elastomers other than tires, and/or elastomeric plastics and the like and combinations thereof.

Examples of polyesters may include, but are not limited to, those having repeating aromatic or cyclic units such as those containing a repeating terephthalate, isophthalate, or naphthalate units such as polyethylene terephthalate (PET), modified PET, or those containing repeating furanate repeating units. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

Also included within the definition of the terms "PET" and "polyethylene terephthalate" are polyesters having repeating terephthalate units (whether or not they contain repeating ethylene glycol-based units) and one or more residues or moieties of a glycol including, for example, TMCD, CHDM, propylene glycol, or NPG, isosorbide, 1,4-butanediol, 1,3-propane diol, and/or diethylene glycol, or combinations thereof. Examples of polymers with repeat terephthalate units can include, but are not limited to, polypropylene terephthalate, polybutylene terephthalate, and copolyesters thereof. Examples of aliphatic polyesters can include, but are not limited to, polylactic acid (PLA), polyglycolic acid, polycaprolactones, and polyethylene adipates. The polymer may comprise mixed aliphatic-aromatic copolyesters including, for example, mixed terephthalates/adipates.

In an illustrative embodiment, as may be combined with one or more of the preceding paragraphs, the waste plastic may comprise terephthalate repeating units in an amount of at least about 1, at least about 5, at least about 10, at least about 15, at least about 20, at least about 25, at least about 30, at least about 35, at least about 40, or at least about 45 and/or not more than about 75, not more than about 70, not more than about 60, or not more than about 65 weight percent, based on the total weight of the plastic in the waste plastic stream, or it may include terephthalate repeat units in an amount in the range of from about 1 to about 75 weight percent, about 5 to about 70 weight percent, or about 25 to about 75 weight percent, based on the total weight of the stream.

Examples of polyolefins may include, but are not limited to, high-density polyethylene (HDPE), low-density polyethylene (LDPE), high molecular weight polyethylene (HMWPE), low molecular weight polyethylene (LMWPE), polypropylene (PP), atactic polypropylene, isotactic polypropylene, syndiotactic polypropylene, crosslinked polyethylene, amorphous polyolefins, and the copolymers of any one of the aforementioned polyolefins. In an illustrative embodiment, as may be combined with one or more of the preceding paragraphs, the waste plastic may include polymers including linear low-density polyethylene (LLDPE), polymethylpentene, polybutene-1, and copolymers thereof. In an embodiment, the waste plastic may comprise flashspun high-density polyethylene.

In an illustrative embodiment, as may be combined with one or more of the preceding paragraphs, the one or more waste plastic feedstocks can include, for example, thermosetting, thermoplastic, and/or elastomeric plastics. For example, the number average molecular weight of the thermosetting, thermoplastic, and/or elastomeric plastics can be at least about 300, or at least about 500, or at least about 1000, or at least about 5,000, or at least about 10,000, or at least about 20,000, or at least about 30,000, or at least about 50,000 or at least about 70,000 or at least about 90,000 or at least about 100,000, or at least about 130,000 and up to about 300,000, or up to about 200,000, or up to about 150,000, or up to about 100,000, or up to about 90,000, or up to about 70,000, or up to about 50,000, or up to about 30,000, or up to about 20,000, or up to about 10,000, or up to about 5,000, or up to about 1,000.

Examples of cellulose materials include, but are not limited to, cellulose acetate, cellulose diacetate, cellulose triacetate, cellulose acetate propionate, cellulose acetate butyrate, as well as regenerated cellulose such as viscose. Additionally, the cellulose materials can include cellulose derivatives having an acyl degree of substitution of less than about 3, not more than about 2.9, not more than about 2.8, not more than about 2.7, or not more than about 2.6 and/or at least about 1.7, at least about 1.8, or at least about 1.9.

In an illustrative embodiment, as may be combined with one or more of the preceding paragraphs, a waste plastic may include a mixed plastic waste ("MPW") containing any combination of the foregoing waste plastics.

In an illustrative embodiment, as may be combined with one or more of the preceding paragraphs, the one or more waste plastic feedstocks can be any organic synthetic polymer that is solid at 25° C. at 1 atm. For example, in an illustrative embodiment, the organic synthetic polymers that are solid at 25° C. and 1 atmosphere of pressure may have a number average molecular weight ($M_n$) of at least about 300, or at least about 500, or at least about 1000, or at least about 5,000, or at least about 10,000, or at least about 20,000, or at least about 30,000, or at least about 50,000 or at least about 70,000 or at least about 90,000 or at least about 100,000, or at least about 130,000, or at least about 150,000 Daltons. The weight average molecular weight (Mw) of the polymers can be at least about 300, or at least about 500, or at least about 1000, or at least about 5,000, or at least about 10,000, or at least about 20,000, or at least about 30,000 or at least about 50,000, or at least about 70,000, or at least about 90,000, or at least about 100,000, or at least about 130,000, or at least about 150,000, or at least about 300,000 or at least about 400,000 Daltons. In an embodiment or in combination with any embodiment mentioned herein, the polymers have an average molecular weight, $M_w$, in the range of about 5,000 to about 150,000. In an embodiment or in combination with any embodiment mentioned herein, the polymers have an average molecular weight, $M_w$, in the range of greater than about 150,000 to about 400,000.

In an illustrative embodiment, as may be combined with one or more of the preceding paragraphs, the form of the one or more waste plastic feedstocks can include any of the forms of articles, products, materials, or portions thereof. For example, a portion of an article can take the form of sheets, extruded shapes, moldings, films, carpet, laminates, foam pieces, chips, flakes, particles, agglomerates, briquettes, powder, shredded pieces, long strips, randomly shaped pieces having a wide variety of shapes, or any other form other than the original form of the article and adapted to feed to the FCC unit discussed hereinbelow.

In an illustrative embodiment, as may be combined with one or more of the preceding paragraphs, the one or more waste plastic feedstocks can be in the form of solid particles, such as chips, flakes, or a powder. In another embodiment, the one or more waste plastic feedstocks may comprise particulates such as, for example, shredded plastic particles, chopped plastic particles, or plastic pellets.

In an illustrative embodiment, as may be combined with one or more of the preceding paragraphs, the one or more waste plastic feedstocks can include at least about 50, or at least about 55, or at least about 60, or at least about 65, or at least about 70, or at least about 75, or at least about 80, or at least about 85, or at least about 95, or at least about 99 weight percent of recycled textiles and/or recycled carpet, such as synthetic fibers, rovings, yarns, nonwoven webs, cloth, fabrics and products made from or containing any of the aforementioned plastics. The textiles can include woven, knitted, knotted, stitched, tufted, felted, embroidered, laced, crocheted, braided, or nonwoven webs and materials. The textiles can include fabrics, fibers separated from a textile or other product containing fibers, scrap or off spec fibers or yarns or fabrics, or any other source of loose fibers and yarns. Furthermore, the textiles may also include staple fibers, continuous fibers, threads, tow bands, twisted and/or spun yarns, grey fabrics made from yarns, finished fabrics produced by wet processing gray fabrics, garments made from the finished fabrics, or any other fabrics. Textiles include apparels, interior furnishings, and industrial types of textiles. Textiles also include post-industrial textiles or post-consumer textiles or both.

Examples of textiles in the apparel category (things humans wear or made for the body) include, but are not limited to, sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplanes, trains, buses) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, the article made from the dry laid nonwoven web is classified as a textile. Examples of suitable articles that may be formed from dry laid nonwoven webs as described herein can include those for personal, consumer, industrial, food service, medical, and other types of end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use.

Nonwoven webs can also be used as padding for pillows, mattresses, and upholstery, batting for quilts and comforters. In the medical and industrial fields, nonwoven webs of the present invention may be used for medical and industrial face masks, protective clothing, caps, and shoe covers, disposable sheets, surgical gowns, drapes, bandages, and medical dressings. Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel. The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include a single type or multiple types of natural fibers and/or a single type or multiple types of synthetic fibers. Examples of textile fiber combinations include all natural, all synthetic, two or more types of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, papyrus, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horsehair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as TENCEL™), Cupro, Modal, acetates such as polyvinylacetate, polyamides including nylon, polyesters such as PET, olefinic polymers such as polypropylene and polyethylene, polycarbonates, poly sulfates, polysulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

The textiles can be in any of the forms mentioned above, such as size reduction via chopping, shredding, harrowing, confrication, pulverizing, or cutting a feedstock of textiles to make size reduced textiles. The textiles can also be densified. Examples of processes that densify include those that agglomerate the textiles through heat generated by frictional forces or particles made by extrusion or other external heat applied to the textile to soften or melt a portion or all of the textile.

The one or more waste plastic feedstocks can be obtained from a plastic source including, by way of example, a hopper, storage bin, railcar, over-the-road trailer, or any other device that may hold or store waste plastics. In an embodiment, the plastic source can include a municipal reclaimer facility, an industrial facility, a recycling facility, a commercial facility, a manufacturing facility, or combinations thereof.

In illustrative embodiments, the waste plastics can be washed to remove any metal contaminants such as sodium, calcium, magnesium, aluminum, and non-metal contaminants coming from other waste sources. Non-metal contaminants include contaminants coming from the Periodic Table Group 14, such as silica, contaminants from Group 15, such as phosphorus and nitrogen compounds, contaminants from Group 16, such as sulfur compounds, and halide contaminants from Group 17, such as fluoride, chloride, and iodide. The residual metals, non-metal contaminants, and halides need to be removed to less than about 50 parts per million (ppm), or less than about 30 ppm or less than about 5 ppm.

Turning back to FIG. 1, recycled inert carrier fluid 155 is received as a continuous stream into blending unit 110 and combined with one or more waste plastic feedstocks 105 to form a solution stream 120. For example, after transporting the one or more waste plastic feedstocks 105 as solution stream 120 to refinery processing unit 140 for processing the one or more waste plastic feedstocks 105, the recycled inert carrier fluid 155 is recovered in separation unit 150 and recycled back to blending unit 110 for dissolving another one or more waste plastic feedstocks 105 for transporting another solution stream 120 to refinery processing unit 140. As such, the process described herein is a continuous process for transporting one or more waste plastic feedstocks 105 to refinery processing unit 140.

In an illustrative embodiment, as may be combined with one or more of the preceding paragraphs, recycled inert carrier fluid 155 can be any inert carrier fluid for transporting one or more waste plastic feedstocks 105 to refinery processing unit 140 and capable of being recycled back to transport another one or more waste plastic feedstocks 105 to refinery processing unit 140 in a continuous process. In other words, recycled inert carrier fluid 155 is an inert carrier fluid which has a relatively low conversion rate when fed into refinery processing unit for processing such that a relatively high amount of inert carrier fluid can be separated from the processed waste plastic feedstocks and recycled back to the blending unit 110. In this manner, the one or more waste plastic feedstocks 105 can be substantially converted. For example, in an illustrative embodiment, the one or more waste plastic feedstocks 105 have a conversion rate in a refinery processing unit of greater than about 70%. In another illustrative embodiment, the one or more waste plastic feedstocks 105 have a conversion rate in a refinery processing unit of greater than about 90%. In another illustrative embodiment, the one or more waste plastic feedstocks 105 have a conversion rate in a refinery processing unit of greater than about 95%.

In some embodiments, recycled inert carrier fluid 155 can be a recycled inert carrier fluid having a conversion rate in a refinery processing unit of less than about 50%. In some embodiments, recycled inert carrier fluid 155 can be a recycled inert carrier fluid having a conversion rate in a refinery processing unit of less than about 25%. In some embodiments, recycled inert carrier fluid 155 can be a recycled inert carrier fluid having a conversion rate in a refinery processing unit of less than about 5%.

In some embodiments, recycled inert carrier fluid 155 can be a recycled inert carrier fluid having a conversion rate in a refinery processing unit in the presence of an ECAT catalyst of less than about 50%. In some embodiments, recycled inert carrier fluid 155 can be a recycled inert carrier fluid having a conversion rate in a refinery processing unit in the presence of an ECAT catalyst of less than about 40%. In some embodiments, recycled inert carrier fluid 155 can be a recycled inert carrier fluid having a conversion rate in refinery processing unit in the presence of an ECAT catalyst of less than about 25%.

In some embodiments, recycled inert carrier fluid 155 can be a recycled inert carrier fluid having a conversion rate in refinery processing unit in the presence of a ZSM-5 catalyst of less than about 25%. In some embodiments, recycled inert carrier fluid 155 can be a recycled inert carrier fluid having a conversion rate in refinery processing unit in the presence of a ZSM-5 catalyst of less than about 20%. In some embodiments, recycled inert carrier fluid 155 can be a recycled inert carrier fluid having a conversion rate in refinery processing unit in the presence of a ZSM-5 catalyst of less than about 5%.

In an illustrative embodiment, as may be combined with one or more of the preceding paragraphs, recycled inert carrier fluid 155 can be characterized as follows:
  having a total paraffin content of less than or equal to about 20 wt. %, e.g., from 0 to about 20 wt. % or from 0.1 wt. % to about 20 wt. %; and
  a total aromatics content of from about 50 wt. % to about 99 wt. %.

In an illustrative embodiment, as may be combined with one or more of the preceding paragraphs, when recycled inert carrier fluid 155 is processed in the presence of a ZSM-5 catalyst, recycled inert carrier fluid 155 can be characterized as follows:
  having a total paraffin content of from about 0.1 wt. % to about 20 wt. %; and
  a total aromatics content of from about 50 wt. % to about 99 wt. %.

In an illustrative embodiment, as may be combined with one or more of the preceding paragraphs, when recycled inert carrier fluid 155 is processed in the presence of an ECAT catalyst, recycled inert carrier fluid 155 can be characterized as follows:
  having a total paraffin content of from about 0.1 wt. % to about 20 wt. %; and
  a total aromatics content of from about 50 wt. % to about 99 wt. %.

In an illustrative embodiment, as may be combined with one or more of the preceding paragraphs, suitable recycled inert carrier fluids include, for example, light cycle oil (boiling range of 221° C. to 343° C.) (430° F. to 650° F.), heavy gasoline (boiling range of 130° C. to 221° C.) (265° F. to 430° F.), heavy reformate (boiling range of 138° C. to 188° C.) (280° F. to 370° F.), heavy heavy reformate (boiling range of 149° C. to 310° C.) (300° F. to 590° F.) and the like and mixtures thereof. As one skilled in the art will appreciate, these recycled inert carrier fluids are obtained from refinery operations in a refinery processing unit such as a catalytic reforming process. Light cycle oil is a preferred inert carrier solvent for the FCC process.

In another illustrative embodiment, as may be combined with one or more of the preceding paragraphs, recycled inert carrier fluid 155 can include any inert carrier fluid with a boiling point in the range of about 300° F. to about 700° F. suitable for dissolving waste plastics.

When exiting refinery processing unit 140, the recycled inert carrier fluid 155 will be a hot recycled inert carrier fluid such the heat can be used to accelerate the dissolution rate of the one or more waste plastic feedstocks 105. In an illustrative embodiment, recycled inert carrier fluid 155 will be received in blending unit 110 having a temperature ranging from about 110° C. to about 220° C. In another illustrative embodiment, recycled inert carrier fluid 155 will be received in blending unit 110 having a temperature ranging from about 130° C. to about 260° C. Accordingly, in some embodiments, to dissolve one or more waste plastic feedstocks 105, the recycled inert carrier fluid 155 is fed into blending unit 110 at a temperature above the melting point of the one or more waste plastic feedstocks 105 such that the one or more waste plastic feedstocks 105 are dissolved in the recycled inert carrier fluid 155.

As one skilled in the art will readily appreciate, when the one or more waste plastic feedstocks 105 is a single waste plastic feedstock, the melting point is of that particular waste plastic feedstock. In the case where the one or more waste plastic feedstocks 105 are more than one waste plastic feedstock, then the melting point of the one or more waste plastic feedstocks will be the melting point of the waste plastic with the highest melting point. Thus, the melting points of all the waste plastic feedstocks must be exceeded.

In some embodiments, recycled inert carrier fluid 155 is fed into blending unit 110 at a temperature below the melting point of the one or more waste plastic feedstocks 105. Thus, it may be necessary to operate the blending unit 110 at a temperature of from about 150° C. to about 260° C. to form solution stream 120.

In some embodiments, the solution of the one or more waste plastic feedstocks 105 and recycled inert carrier fluid 155 is prepared by mixing the one or more waste plastic feedstocks 105 and recycled inert carrier fluid 155 together and then heating the mixture above the melting point of the one or more waste plastic feedstocks 105 while thoroughly mixing. Alternatively, the solution can be prepared by melting the one or more waste plastic feedstocks 105 only and then adding the waste plastic melt to the recycled inert carrier fluid 155 while thoroughly mixing. Alternatively, the solution can be prepared by heating the recycled inert carrier fluid 155 only to the temperature above the melting point of the one or more waste plastic feedstocks 105 and then adding the one or more waste plastic feedstocks 105 to the heated recycled inert carrier fluid 155 while thoroughly mixing the mixture and maintaining the temperature above the melting point of the waste plastic feedstock. The heating and mixing can be done in an open atmosphere or under an oxygen-free inert atmosphere.

In the case where there is an insufficient amount of recycled inert carrier fluid to dissolve and transport the one or more waste plastic feedstocks 105, an additional inert carrier fluid via inert carrier fluid stream 115 can be introduced into blending unit 110 to be combined with the one or more waste plastic feedstocks 105 and recycled inert carrier fluid 155. Inert carrier fluid stream 115 can be composed of any of the inert carrier fluids discussed above. In an illustrative embodiment, inert carrier fluid stream 115 is the same inert carrier fluid as recycled inert carrier fluid 155. The inert carrier fluid stream 115 is generally liquid at room temperature.

In some embodiments, as may be combined with one or more of the preceding paragraphs, it may be necessary to operate the blending unit 110 at a temperature of from about 150° C. to about 260° C. to form solution stream 120 at a residence time of from about 5 minutes to about 120 minutes and at a pressure of about 1 atmosphere to about 3 atmospheres.

The solution stream 120 is a hot homogeneous liquid containing the dissolved one or more waste plastic feedstocks 105 in the recycled inert carrier fluid 155. In an illustrative embodiment, the solution will contain from about 1 wt. % to about 40 wt. %, based on the total weight of the solution, of the one or more waste plastic feedstocks 105. In another illustrative embodiment, the solution will contain from about 1 wt. % to about 20 wt. %, based on the total weight of the solution, of the one or more waste plastic feedstocks 105. In another illustrative embodiment, the solution will contain from about 20 wt. % to about 40 wt. %, based on the total weight of the solution, of the one or more waste plastic feedstocks 105. In the illustrative embodiments, the remaining amount of the solution will be composed of the recycled inert carrier fluid 155 and any make-up inert carrier fluid.

System 100 can optionally include a filtration unit 125 for receiving solution stream 120 to remove any undissolved plastic particles or any solid impurities that may be present in the solution stream 120 to form filtered stream 130. In an illustrative embodiment, the filter size will be any size suitable to remove the impurities in waste plastic. Any undissolved plastic particles or impurities removed exit the filtration unit 125 via waste stream 135. The most common impurities in waste plastic are Ca, Mg, Si and Ti that may come from plastic consumer product manufacturing such as calcium carbonate, silica, talc which are commonly used filler material. Al, Fe, P, Zn can also be present in substantial quantities. Other impurities may include undissolved plastic such as nylon and PVC, cellulose derived materials.

System 100 further includes refinery processing unit 140 for receiving solution stream 120 or filtered stream 130 for processing the one or more waste plastic feedstocks 105 to form processed stream 145. Suitable refinery processing units include, for example, a fluid catalytic cracking (FCC) unit, hydrocracking unit, and hydrotreating unit, to process the one or more waste plastic feedstocks 105 in the presence of one or more catalysts with simultaneous conversion of the waste plastic. By employing the recycled inert carrier fluid 155 in the process described herein, the refinery processing unit can process the one or more waste plastic feedstocks 105 such as by cracking without substantially converting the recycled inert carrier fluid 155 as described above so that the recycled inert carrier fluid 155 can be further recycled and reused.

The presence of one or more catalysts in the refinery processing unit 140 allows for conversion of the one or more waste plastic feedstocks 105 to higher value products at a lower operating temperature than the typical pyrolysis temperature. The yields of undesirable byproducts (e.g., offgas, tars, coke) are also lower than the typical pyrolysis process. For the hydroprocessing units (hydrocracking and hydrotreating units), hydrogen is added to units to improve the conversion of the plastics. Fluid catalytic cracking and hydrocracking processes are preferred modes of catalytic conversion of the solution of waste plastic feedstock in the inert carrier fluid.

Figure 2:
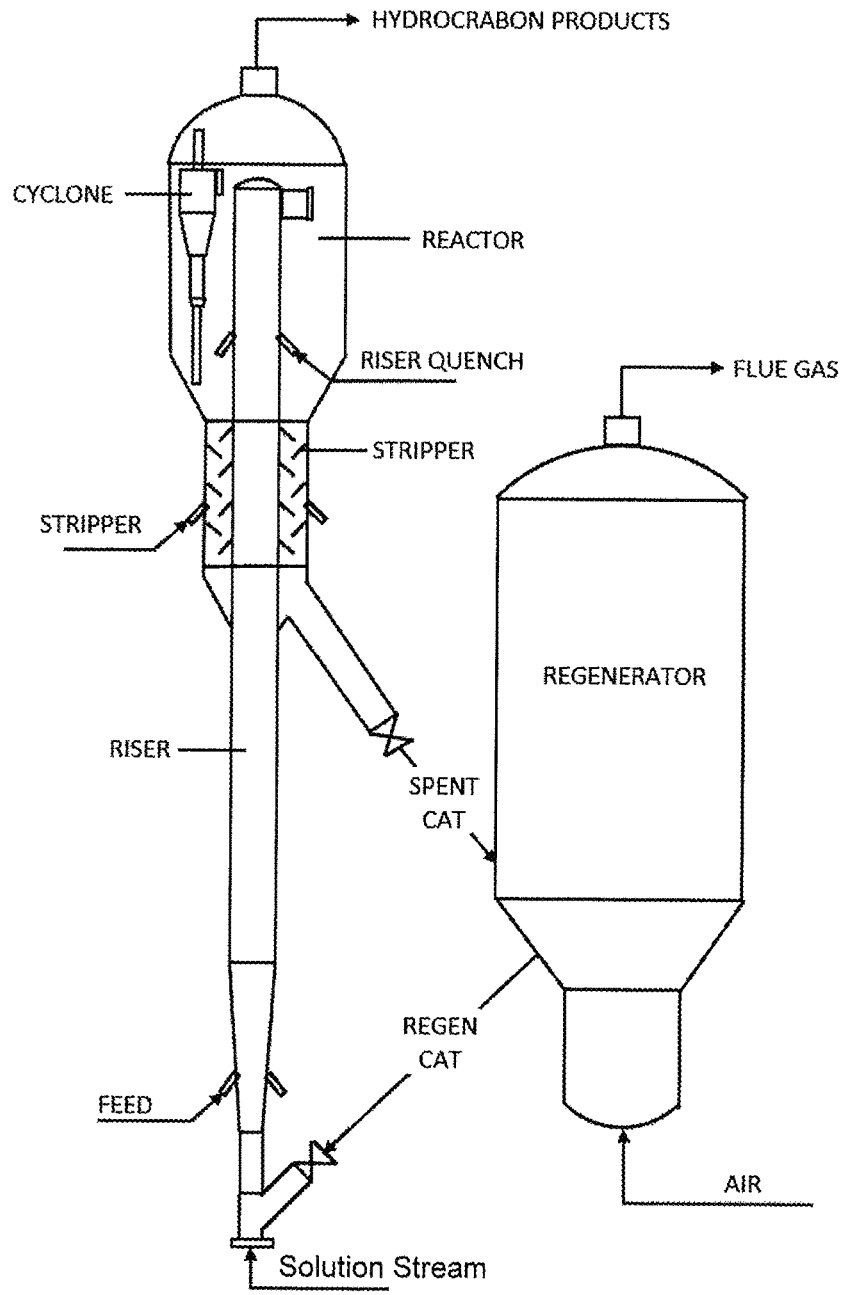
FIG. 2 illustrates a fluid catalytic cracking (FCC) unit, according to an illustrative embodiment.

In an illustrative embodiment, refinery processing unit 140 of FIG. 1 can be discussed with reference to FIG. 2, which depicts a schematic diagram of an illustrative fluid catalytic cracking (FCC) unit as known in the art. The FCC unit includes at least a riser, a reactor and a regenerator each thereof being operatively interconnected. In general, the fluidized catalytic cracking unit depicts where the solution stream 120 or filtered stream 130 could be introduced into the unit. The fluidized catalytic cracking unit can be designed to have two or more feedstock injection points, namely, at least one injection point for a first waste plastic feedstock and at least one for one or more other solution stream 120 or filtered stream 130 or these feedstocks could be co-injected (by having them mixed upstream of the injection point) or the fluidized catalytic cracking unit could be fitted with multiple points of injection for either, both or mixtures of the feedstocks.

In an illustrative embodiment, as may be combined with one or more of the preceding paragraphs, the solution stream 120 or filtered stream 130 can be introduced into the fluidized catalytic cracking unit in its present state to subject it to cracking in the presence of one or more catalysts as discussed below. In illustrative embodiments, the fluid catalytic cracking process in which the one or more waste plastic feedstocks in the solution stream 120 or filtered stream 130 will be cracked to, for example, lighter hydrocarbon products, takes place by contact of the solution stream 120 or filtered stream 130 in a cyclic catalyst recirculation cracking process with a circulating fluidizable catalytic cracking catalyst inventory consisting of particles having a size ranging from about 20 to about 100 microns.

In an illustrative embodiment, as may be combined with one or more of the preceding paragraphs, the cracking catalyst that can be used herein can be any known cracking catalyst for use in a fluidized catalytic cracking unit. Suitable cracking catalysts include, for example, FCC catalysts which generally comprise a zeolite. In an illustrative embodiment, a cracking catalyst can comprise either a large-pore zeolite or a mixture of at least one large-pore zeolite catalyst and at least one medium-pore molecular sieve catalyst. Suitable large-pore zeolites include, for example, a Y zeolite with or without rare earth metal, a HY zeolite with or without a rare earth metal, an ultra-stable Y zeolite with or without a rare earth metal, a Beta zeolite with or without a rare earth metal, and combination thereof. Suitable medium-pore zeolites include, for example, ZSM-5, ZSM-11, ZSM-12, ZSM-23, ZSM-35, ZSM-48, SSZ-32, and other similar materials.

In non-limiting illustrative embodiments, a suitable cracking catalyst for use herein is an equilibrium catalyst (ECAT catalyst) such as, for example, typical ultra-stable Y based FCC catalysts such as Y based zeolite catalysts. In non-limiting illustrative embodiments, a suitable cracking catalyst for use herein is a circulating inventory of an equilibrium catalyst composition.

In other non-limiting illustrative embodiments, a suitable cracking catalyst for use herein is a ZSM-5 catalyst.

In an illustrative embodiment, representative examples of the steps in the cyclic process include: (1) the feed is catalytically cracked in a catalytic cracking zone, normally a riser cracking zone, operating at catalytic cracking conditions by contacting the feed with a source of hot, regenerated cracking catalyst to produce an effluent comprising cracked products and spent catalyst containing coke and strippable hydrocarbons; (2) the effluent is discharged and separated, normally in one or more cyclones, into a vapor phase rich in cracked product and a solids rich phase comprising the spent catalyst; (3) the vapor phase is removed as product and fractionated in the FCC main column and its associated side columns to form liquid cracking products including gasoline; and (4) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

Suitable cracking conditions include, for example, a reaction temperature of about 425° C. to about 650° C. (e.g., about 450° C. to about 600° C., or about 500° C. to about 575° C.), a catalyst regeneration temperature of about 600° C. to about 800° C.; a hydrocarbon partial pressure of about a pressure of from about 100 kPa to about 1100 kPa (e.g., about 200 kPa to about 400 kPa); a catalyst-to-oil mass ratio of from about 3 to about 12 (e.g., about 4 to about 11, or about 5 to about 10); and a catalyst contact time of from about 0.1 to about 15 seconds (e.g., about 0.2 to about 10 seconds). Suitable catalyst regeneration temperatures include a temperature ranging from about 600° C. to about 800° C. at a pressure ranging from about 100 kPa to about 1100 kPa.

The term "hydrocarbon partial pressure" is used herein to indicate the overall hydrocarbon partial pressure in the riser reactor. The term "catalyst-to-oil ratio' refers to the ratio of the catalyst circulation amount (e.g., ton/h) and the feedstock supply rate (e.g., ton/h). The term "catalyst contact time" is used herein to indicate the time from the point of contact between the feedstock and the catalyst at the catalyst inlet of the riser reactor until separation of the reaction products and the catalyst at the stripper outlet.

Turning back to FIG. 1, system 100 further includes a separation unit 150 for receiving processed stream 145 for separating the recycled inert carrier fluid 155 from the processed (e.g., cracked) one or more waste plastic feedstocks by conventional means. The recycled inert carrier fluid 155 exits the separation unit 150 and is sent back to blending unit 110 to be reused for transporting another one or more waste plastic feedstocks 105 as discussed above.

In some embodiment, the processed one or more waste plastic feedstocks which have been subjected to fluidized catalytic cracking conditions provides a hydrocarbon product with a lower carbon footprint than the corresponding hydrocarbon product produced from a petroleum-based feedstock.

In some embodiment, the processed one or more waste plastic feedstocks which have been subjected to fluidized catalytic cracking conditions are separated out and sent for further processing via stream 160. For example, the processed one or more waste plastic feedstocks can have a variety of cracked hydrocarbon products that may be separated into two or more constituent streams by conventional means. In non-limiting illustrative embodiments, constituent streams may include a fuel gas stream, an ethylene stream, a propylene stream, a butylene stream, an LPG stream, a naphtha stream, an olefin stream, a diesel stream, a gasoline stream, a light cycle oil LCO), a heavy cycle oil (HCO) stream, an aviation fuel stream, a cat unit bottoms (slurry/decant oil) stream, and other hydrocarbon streams.

In some cases, the conversion of waste plastic into clean fuels takes less energy than production of fuels from a virgin petroleum feedstock. As the collection and processing of waste plastic improves, as it is happening now, the gain energy efficiencies will further improve. In those cases, fuels produced from the blend of waste plastic and oil will have recycled contents and lower carbon footprints than the corresponding fuels made from pure petroleum feedstock. The process of the non-limiting illustrative embodiments disclosed herein can produce clean gasoline, jet fuel and diesel with recycled contents and lower $CO_2$ (lower carbon) footprints from waste plastic.

In some aspects, a constituent stream may be further processed. In an illustrative embodiment, an olefinic constituent stream may be sent to an alkylation unit for further processing. For example, a $C_3$ olefin/paraffin mix stream of propane and propylene mix can be sent to and separated by a propane/propylene splitter (PP splitter) to produce pure streams of propane and propylene. The propylene can be fed to a propylene polymerization unit to produce polypropylene.

The pure propane may be fed to a propane dehydrogenation unit to make additional propylene, and then ultimately polypropylene in the propylene polymerization unit.

Dehydrogenation of propane is practiced widely in the industry to produce propylene. The reaction is endothermic, conversion is maintained by multi-stage reactors and interstage heaters. The unit typically operates at high temperature (>900° F.) and low pressure (<50 psig) in the presence of noble metal (Pt) catalyst. The multi-stage process generates approximately 85% purity propylene/propane mixture. This stream is directed to a propane/propylene (PP) splitter which is a high efficiency distillation column. The splitter produces pure propylene stream with 99.5-99.8% purity.

The PP splitter unit and/or propane dehydrogenation unit can be located away from a refinery, near a refinery, or within a refinery. The propane/propylene mix is sent to the PP splitter by truck, barge, rail car or pipeline. It is preferred that the PP splitter unit and propane dehydrogenation unit are in close proximity to the refinery FCC unit.

In addition, olefins from the constituent streams may be further separated and recovered for use in renewable plastics and petrochemicals.

In an illustrative embodiment, $C_4$ and other hydrocarbon product streams, such as a heavy fraction from an FCC unit, can sent to appropriate refinery units for upgrading into clean gasoline, diesel, or jet fuel. The gasoline from the FCC unit may be passed directly to a gasoline pool or further upgraded before sending to a gasoline pool.

Hydrocarbon fuel products may be sold or further processed. Examples of further processing include blending, hydroprocessing, or alkylating at least a portion of the hydrocarbon fuel product. Hydrocarbon fuel products may be used as a blend stock and combined with one or more petroleum fuel products and/or renewable fuels. Petroleum-based streams include gasoline, diesel, aviation fuel, or other hydrocarbon streams obtained by refining of petroleum. Examples of renewable fuels include ethanol, propanol, and butanol.

In some aspects, the product stream can comprise a gasoline fraction in an amount ranging from about 30 to about 60 wt. % (e.g., about 40 to about 50 wt. %), based on the total product stream composition, as measured by ASTM D2887.

In an illustrative embodiment, as may be combined with one or more of the preceding paragraphs, when one of the separated constituent streams is a heavy cycle oil (HCO), it can be subjected to coking followed by calcination to obtain needle coke. In an illustrative embodiment, the heavy cycle oil can be sent to a delayed coker unit as known in the art and subjected to coking under coking conditions to form an intermediate coke product. In an illustrative embodiment, the coking conditions include, for example, exposing the heavy cycle oil to a temperature ranging from about 450 to about 520° C. for a time period ranging from about 12 to about 24 hours.

In an illustrative embodiment, as may be combined with one or more of the preceding paragraphs, the heavy cycle oil can be subjected to coking in the presence of an aromatic polymer material followed by calcination to obtain needle coke. In an illustrative embodiment, the heavy cycle oil and the aromatic polymer material are sent to a delayed coker unit as known in the art and subjected to coking under coking conditions to form an intermediate coke product. In an illustrative embodiment, the coking conditions include, for example, exposing the heavy cycle oil and the aromatic polymer material to a temperature ranging from about 450 to about 520° C. for a time period ranging from about 12 to about 24 hours.

In an illustrative embodiment, the heavy cycle oil can be co-fed with the aromatic polymer material into the delayed coking unit. In another embodiment, a solution of the heavy cycle oil and the aromatic polymer material are fed into the delayed coking unit. For example, the solution is obtained by dissolving the aromatic polymer material in the heavy cycle oil. In an embodiment, the solution can contain from about 0.1 to about 10 wt. % of the aromatic polymer material.

In an illustrative embodiment, the aromatic polymer material includes, for example, polystyrene. Styrene is also known as ethenylbenzene, vinylbenzene, or phenylethylene. The styrene-based monomer is then polymerized (facilitated by the vinyl group) to form a homo- or copolymer. For example, the styrene-based monomer is polymerized as a homopolymer to form polystyrene.

In an illustrative embodiment, as may be combined with one or more of the preceding paragraphs, the intermediate coke product obtained from the delayed coker unit is calcinated in a calciner under calcinating conditions to obtain needle coke. Suitable calcinating conditions include, for example, a temperature ranging from about 1250 to about 1400° C. and for a time period ranging from about 30 to about 60 minutes.

The following non-limiting examples are illustrative of the present disclosure.

Example 1

Properties of Virgin Plastic Samples and Petroleum Feedstocks Used for Blend Preparations Three commercial plastic samples, low-density polyethylene (LDPE), low molecular weight polypropylene (LMPP) and low molecular weight polystyrene (LMPS) were purchased and their properties are summarized in Table 1.

TABLE 1

Properties of Virgin Plastics Used

|  | LDPE | LMPP | LMPS |
|---|---|---|---|
| Form | Pellets | Pellets | Pellets |
| Melt Index | 25 g/10 min (190° C./2.16 kg) | | |
| Melting Point, ° C. | 116 | 157 | |
| Transition Temp, ° C. | 93, softening | 163, softening | 123-128, softening |
| Density, g/mL at 25° C. | 0.925 | 0.9 | 1.06 |

The petroleum feedstock used to prepare the solutions with plastics include light cycle oil (LCO). The properties of inert carrier fluids LCO, FCC heavy gasoline, heavy reformate and heavy heavy reformate as compared to hydrotreated vacuum gas oil (VGO) are set forth in Table 2. The solubilities of several plastics in LCO were tested and the results are set forth in Table 3.

TABLE 2

Properties of Petroleum Feedstocks

| | Hydrotreated VGO | LCO | FCC heavy gasoline | Heavy reformate | Heavy heavy reformate |
|---|---|---|---|---|---|
| Specific Gravity | 0.897 | 0.956 | 0.810 | 0.873 | 0.927 |
| Carbon, wt. % | 87.84 | 90.50 | 88.4 | 89.9 | 90.2 |
| Hydrogen, wt. % | 12.69 | 9.50 | 11.6 | 10.10 | 9.8 |
| H/C Molar Ratio | 1.73 | 1.26 | 1.57 | 1.33 | 1.30 |
| Bromine Number | 2 | — | N/A | N/A | N/A |
| Total S, ppm | 150 | 900 | 230 | N/A | N/A |
| Total N, ppm | 273 | N/A | N/A | N/A | N/A |
| Ni, ppm | <0.6 | <0.2 | 0 | N/A | N/A |
| V, ppm | <0.6 | <0.2 | 0 | N/A | N/A |
| Simdist, ° F. | | | | | |
| IBP (0.5%) | 462 | 395 | 107 | 255 | 276 |
| 5 wt. % | 573 | 420 | 151 | 280 | 296 |
| 10 wt. % | 616 | 440 | 180 | 287 | 338 |
| 30 wt. % | 706 | 487 | 255 | 300 | 349 |
| 50 wt. % | 775 | 531 | 300 | 330 | 374 |
| 70 wt. % | 854 | 596 | 345 | 343 | 392 |
| 90 wt. % | 962 | 682 | 399 | 350 | 522 |
| 95 wt. % | 1008 | 712 | 417 | 371 | 580 |
| FBP (99.5%) | 1107 | 774 | 445 | 387 | 645 |

TABLE 3

Solubilities of plastics in LCO

| | 10% LDPE | 20% LDPE | 10% LMPP | 20% LMPP | 10% LMW-PS |
|---|---|---|---|---|---|
| LCO | S* | S* | S* | S* | S |

S = stable mixture formed with no apparent phase separation
S* = stable mixture formed with no apparent phase separation at T = 200-320° F.

Example 2

The catalytic cracking of VGO and LCO using an ECAT catalyst and a ZSM-5 catalyst.

Advanced Cracking Evaluation (ACE) Testing

Figure 3:
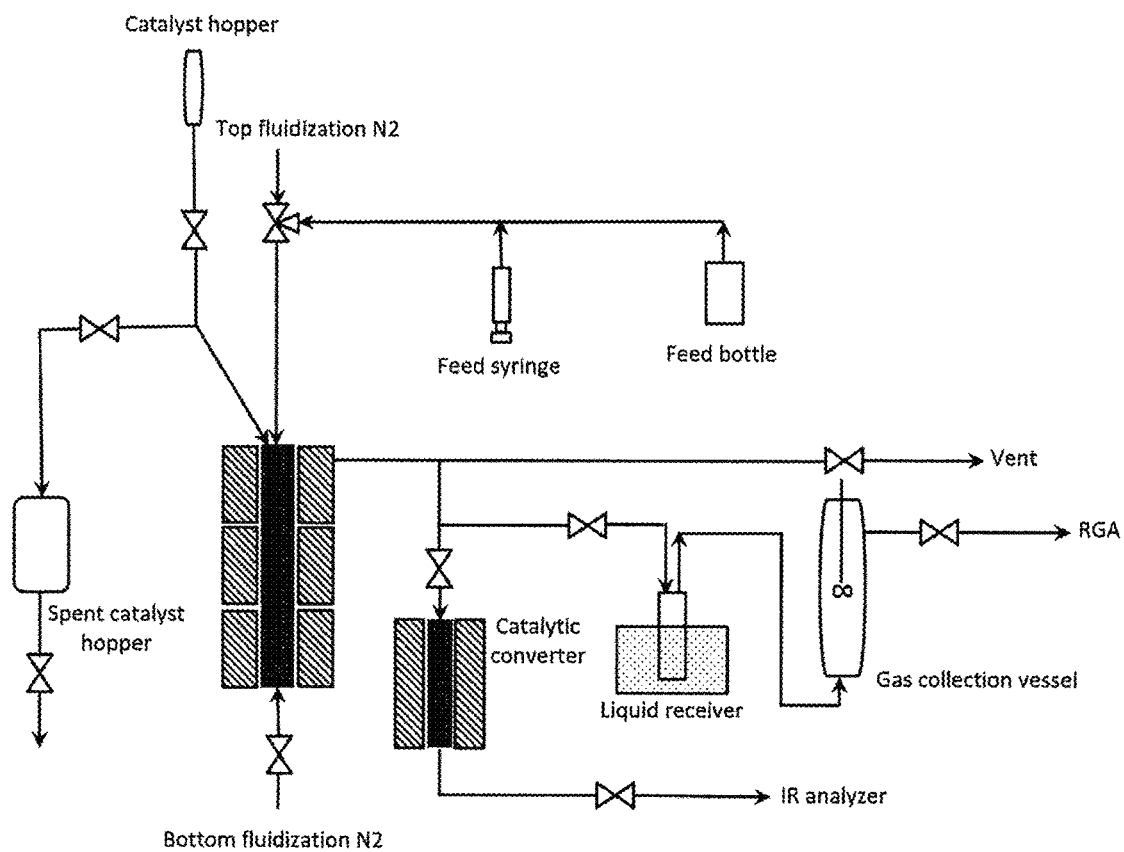
FIG. 3 illustrates a schematic diagram for the experimental setup in the example section, according to an illustrative embodiment.

Catalytic cracking experiments were carried out in an Advanced Cracking Evaluation (ACE) Model C unit fabricated by Kayser Technology Inc. (Texas, USA). A schematic diagram of the ACE Model C unit is shown in FIG. 3. The reactor employed in the ACE unit was a fixed fluidized reactor with 1.6 cm ID. Nitrogen was used as fluidization gas and introduced from both bottom and top. The top fluidization gas was used to carry the feed injected from a calibrated syringe feed pump via a three-way valve. The catalytic cracking was carried out at atmospheric pressure and a temperature of 975° F. For each experiment, a constant amount of feed was injected at the rate of 1.2 g/min for 75 seconds. The catalyst/oil ratio was varied from 4-8. After 75 seconds of feed injection, the catalyst was stripped off by nitrogen for a period of 525 seconds.

During the catalytic cracking and stripping process the liquid product was collected in a sample vial attached to a glass receiver, which was located at the end of the reactor exit and was maintained at −15° C. The gaseous products were collected in a closed stainless-steel vessel (12.6 L) prefilled with N2 at 1 atm. Gaseous products were mixed by an electrical agitator rotating at 60 rpm as soon as feed injection was completed. After stripping, the gas products were further mixed for 10 minutes to ensure homogeneity. The final gas products were analyzed using a refinery gas analyzer (RGA).

After the completion of the stripping process, in-situ catalyst regeneration was carried out in the presence of air at 1300° F. The regeneration flue gas passed through a catalytic converter packed with CuO pellets (LECO Inc.) to oxidize CO to $CO_2$. The flue gas was then analyzed by an online infrared (IR) analyzer located downstream of the catalytic converter. Coke deposited during the cracking process was calculated from the $CO_2$ concentrations measured by the IR analyzer.

The results of experiments showing the catalytic cracking of VGO and LCO using an ECAT catalyst and a ZSM-5 catalyst are set forth below in Table 4. It is seen that LCO advantageously performs as an inert carrier solvent.

TABLE 4

Evaluation of Cracking of VGO and LCO using an ECAT Catalyst and a ZSM-5 Catalyst

| Feed | VGO | VGO | LCO | LCO |
|---|---|---|---|---|
| Catalyst | ECAT | ZSM-5 | ECAT | ZSM-5 |
| Conversion [wt. %][1] | 74.77 | 16.8 | 34.14 | 15.91 |
| True conversion [wt. %][2] | 74.77 | 16.8 | 24.30 | 3.34 |
| Temperature (F) | 975 | 975 | 975 | 975 |
| Cat/Oil, wt./wt. | 6.00 | 6.00 | 6.00 | 6.00 |
| Yield [wt. %] | | | | |
| Coke | 4.17 | 0.74 | 8.28 | 1.02 |
| Dry Gas | 1.95 | 1.76 | 2.18 | 1.36 |
| LPG | 18.44 | 6.83 | 6.60 | 5.12 |
| Ethylene | 0.70 | 1.20 | 0.52 | 1.07 |
| Propylene | 4.93 | 3.26 | 2.21 | 2.53 |
| C4 Olefins | 5.24 | 2.97 | 1.90 | 1.69 |
| Gasoline (C5 - 430° F.) | 50.20 | 7.44 | 17.07 | 8.41 |
| Light Cycle Oil (430° F.-650° F.) | 16.57 | 18.12 | 53.63 | 67.99 |
| Heavy Cycle Oil (650° F.+) | 8.67 | 65.12 | 12.23 | 16.10 |
| Gasoline Properties[3] | | | | |
| n-Paraffins [wt. %] | 2.238 | 14.65 | 1.14 | 3.08 |
| Isoparaffins [wt. %] | 20.236 | 1.60 | 8.97 | 6.59 |
| Aromatics [wt. %] | 57.015 | 63.22 | 83.73 | 85.17 |
| Naphthenes [wt. %] | 9.856 | 1.30 | 1.33 | 0.36 |
| Olefins [wt. %] | 9.654 | 19.23 | 3.29 | 2.04 |
| RON | 93.42 | 97.19 | 89.61 | 83.85 |

TABLE 4-continued

Evaluation of Cracking of VGO and LCO using an ECAT Catalyst and a ZSM-5 Catalyst

| Feed | VGO | VGO | LCO | LCO |
|---|---|---|---|---|
| MON | 83.09 | 78.67 | 78.94 | 72.92 |
| (RON + MON)/2 | 88.26 | 87.93 | 84.27 | 78.39 |
| Benzene | 0.823 | 3.727 | 1.01 | 2.88 |
| Toluene | 6.205 | 12.868 | 4.95 | 4.85 |
| Xylenes | 11.71 | 13.09 | 9.06 | 4.17 |

[1] Conversion is defined as the total amount of feed converted to a boiling point less than 430° F. and coke. For example, conversion = dry gas + LPG + gasoline + coke = 100 − LCO − HCO.
[2] True conversion is to subtract initial fraction of feed that boils below 430° F. For example, about 13% of LCO boils below 430° F. while almost 100% of VGO boils above 430° F.
[3] All properties and yields below this in the table are based only on the gasoline fraction (C5-430° F.) of the total product.

The results in Table 4 show that an inert carrier fluid such as LCO cracks significantly less than VGO. For example, VGO had a conversation rate of 74.77 using an ECAT catalyst as compared to 34.14 and a true conversion of 24.30 for LCO using an ECAT catalyst. The true conversion reflects the actual amount of feed that boils above 430° F. that has been converted to products that boil lower than 430° F. More significantly, VGO had a true conversion of 16.8% using a ZSM-5 catalyst as compared to only a 3.34% true conversion for LCO using a ZSM-5 catalyst. Thus, LCO is more inert, i.e., not reactive, than VGO which results in significantly more LCO (>75% when using ECAT and >96% when using ZSM-5 catalyst) that can be recycled and reused for transporting the waste plastic feedstock. Furthermore, once the recycling of LCO has established its steady-state, the actual recycled LCO stream could be more inert than the example LCO in our test, resulting in less conversion and more efficient use of the inert carrier fluid.

Example 3

The catalytic cracking of waste plastic with LCO (inert carrier solvent) via FCC using a ZSM-5 catalyst. This example shows that combination of inert carrier solvent and a medium pore zeolite catalyst is particularly effective for selective conversion of plastic in FCC with minimal change for the inert carrier solvent.

To study the impact of processing waste plastics and LCO in a refinery FCC unit, laboratory tests with a fluidized catalytic cracking (FCC) process as discussed above were carried out with solutions of waste plastic and LCO using a ZSM-5 catalyst.

The results of the experiments are set forth below in Table 5.

TABLE 5

Evaluation of Solution of Waste Plastic and LCO to FCC with ZSM-5 Catalyst

| Feed | LCO | 10% LDPE in LCO | 10% LMPP in LCO | 10% LMPS in LCO |
|---|---|---|---|---|
| Catalyst | ZSM-5 | ZSM-5 | ZSM-5 | ZSM-5 |
| Conversion [wt. %] | 15.91 | 27.69 | 22.27 | 23.68 |
| Incremental Conversion, wt. % | Base case | 11.78 | 6.36 | 7.77 |
| Temperature (F.) | 975 | 975 | 975 | 975 |
| Cat/Oil, wt./wt. | 6.00 | 6.00 | 6.00 | 6.00 |
| Yield [wt. %] | | | | |
| Coke | 1.02 | 5.49 | 0.90 | 1.04 |
| Dry Gas | 1.36 | 2.43 | 2.17 | 1.41 |
| LPG | 5.12 | 9.54 | 8.49 | 4.35 |
| Ethylene | 1.07 | 2.02 | 1.77 | 1.13 |
| Propylene | 2.53 | 4.45 | 4.10 | 2.19 |
| C4 Olefins | 1.69 | 3.09 | 2.78 | 1.47 |
| Gasoline (C5 - 430° F.) | 8.41 | 10.23 | 10.71 | 16.89 |
| Light Cycle Oil (430° F. - 650° F.) | 67.99 | 58.24 | 62.94 | 61.57 |
| Heavy Cycle Oil (650° F.+) | 16.10 | 14.07 | 14.79 | 14.75 |
| Gasoline Properties (Selectivity of the Gasoline Fraction Only) | | | | |
| n-Paraffins [wt. %] | 3.08 | 2.601 | 3.14 | 2.25 |
| Isoparaffins [wt. %] | 6.59 | 5.000 | 5.13 | 3.35 |
| Aromatics [wt. %] | 85.17 | 84.021 | 82.04 | 90.89 |
| Naphthenes [wt. %] | 0.36 | 1.220 | 1.03 | 2.1 |
| Olefins [wt. %] | 2.04 | 5.758 | 2.94 | 0.43 |
| RON | 83.85 | 96.51 | 91.83 | 101.89 |
| MON | 72.92 | 84.4 | 84.02 | 91.63 |
| (RON + MON)/2 | 78.39 | 90.455 | 87.92 | 96.76 |
| Benzene | 2.88 | 3.718 | 2.96 | 10.61 |
| Toluene | 4.85 | 8.397 | 6.92 | 6.97 |
| Xylenes | 4.17 | 7.62 | 5.88 | 3.38 |

The results in Table 5 show that the waste plastic cracked more easily than LCO. For example, it can be seen that the incremental conversion over the base case is close to the amount of plastic added indicating the plastics are almost all converted. It is seen that much less gas and char are produced as compared with pyrolysis. In addition, while some LCO is converted as is seen by the neat LCO runs, the majority remains as LCO+HCO. The results further show that a significant amount of HCO is generated which can be used to produce needle coke, and the gasoline is high in aromatics with high octane, primarily due to the LCO.

Finally, cofeeding the waste plastics increases the light olefins selectivity which can be used to manufacture circular plastics.

Example 4

The catalytic cracking of waste plastic and LCO via FCC using an ECAT catalyst.

To study the impact of processing waste plastics and LCO in a refinery FCC unit, laboratory tests with a FCC process as discussed above were carried out with solutions of waste plastic and LCO using an ECAT catalyst.

The results of the experiments are set forth below in Table 6.

TABLE 6

Evaluation of Solution of Waste Plastic and LCO to FCC with ECAT Catalyst

| Feed | LCO | 10% LDPE in LCO | 10% LMPP in LCO | 10% LMPS in LCO |
|---|---|---|---|---|
| Catalyst | ECAT | ECAT | ECAT | ECAT |
| Conversion [wt. %] | 34.14 | 44.62 | 39.40 | 44.44 |
| Incremental Conversion, wt. % | Base case | 10.48 | 5.26 | 10.30 |
| Temperature (F.) | 975 | 975 | 975 | 975 |
| Cat/Oil, wt./wt. | 6.00 | 6.00 | 6.00 | 6.00 |
| Yield [wt. %] | | | | |
| Coke | 8.28 | 12.90 | 7.13 | 8.74 |
| Dry Gas | 2.18 | 2.60 | 2.02 | 2.03 |
| LPG | 6.60 | 9.53 | 9.09 | 5.99 |
| Ethylene | 0.52 | 0.63 | 0.52 | 0.53 |
| Propylene | 2.21 | 3.20 | 3.05 | 2.17 |
| C4 Olefins | 1.90 | 2.97 | 3.04 | 1.76 |
| Gasoline (C5 - 430° F.) | 17.07 | 19.58 | 21.15 | 27.69 |
| Light Cycle Oil (430° F. - 650° F.) | 53.63 | 44.99 | 49.47 | 45.39 |
| Heavy Cycle Oil (650° F.+) | 12.23 | 10.39 | 11.13 | 10.17 |
| Gasoline Properties | | | | |
| n-Paraffins [wt. %] | 1.14 | 1.65 | 1.76 | 0.79 |
| Isoparaffins [wt. %] | 8.97 | 8.72 | 11.05 | 4.23 |
| Aromatics [wt. %] | 83.73 | 82.89 | 79.12 | 91.81 |
| Naphthenes [wt. %] | 1.33 | 2.37 | 2.66 | 1.81 |
| Olefins [wt. %] | 3.29 | 4.21 | 5.36 | 1.27 |
| RON | 89.61 | 96.99 | 99.65 | 102.87 |
| MON | 78.94 | 86.25 | 91.53 | 92.79 |
| (RON + MON)/2 | 84.27 | 91.62 | 95.59 | 97.83 |
| Benzene | 1.01 | 1.02 | 1.03 | 4.16 |
| Toluene | 4.95 | 5.07 | 5.09 | 4.46 |
| Xylenes | 9.06 | 9.42 | 10.22 | 6.32 |

The results in Table 6 show that the waste plastic cracked more easily than LCO. For example, it can be seen that the waste plastics almost all convert based on the increase in conversion compared to neat LCO. It can be seen that much less gas and char are produced as compared with pyrolysis. In addition, while some LCO is converted as is seen by the neat LCO runs, the majority remains as LCO+HCO. The results further show that a significant amount of HCO is generated which can be used to produce needle coke, and the gasoline is high in aromatics with high octane, primarily due to the LCO. Finally, cofeeding the waste plastics increases the light olefins selectivity which can be used to manufacture circular plastics.

According to an aspect of the present disclosure, a continuous process for transporting a waste plastic feedstock to a refinery processing unit, comprises forming a solution comprising (i) about 1 to about 40 wt. %, based on the total weight of the solution, of one or more waste plastic feedstocks and (ii) a recycled inert carrier fluid received from a refinery processing unit, and processing the solution comprising the one or more waste plastic feedstocks and the recycled inert carrier fluid in the presence of a catalyst under catalytic cracking conditions.

In one or more additional illustrative embodiments, as may be combined with the preceding paragraphs, the one or more waste plastic feedstocks comprise one or more polyesters, one or more polyolefins and combinations thereof.

In one or more additional illustrative embodiments, as may be combined with the preceding paragraphs, the one or more waste plastic feedstocks comprise one of a polyethylene or polypropylene waste plastic.

In one or more additional illustrative embodiments, as may be combined with the preceding paragraphs, the one or more waste plastic feedstocks comprise one or more of a high-density polyethylene, a low-density polyethylene, a high molecular weight polyethylene, a low molecular weight polyethylene, polypropylene, polystyrene and combinations thereof.

In one or more additional illustrative embodiments, as may be combined with the preceding paragraphs, the recycled inert carrier fluid is characterized as follows:
 having a total paraffin content of less than or equal to about 20 wt. %, and
 a total aromatics content of from about 50 wt. % to about 99 wt. %.

In one or more additional illustrative embodiments, as may be combined with the preceding paragraphs, the recycled inert carrier fluid is one or more of a light cycle oil, a heavy gasoline, a heavy reformate and a heavy heavy reformate.

In one or more additional illustrative embodiments, as may be combined with the preceding paragraphs, the recycled inert carrier fluid has a conversion rate in a refinery processing unit of less than about 20% using a ZSM-5 catalyst.

In one or more additional illustrative embodiments, as may be combined with the preceding paragraphs, the recycled inert carrier fluid has a conversion rate in a refinery processing unit of less than about 40% using an ECAT catalyst.

In one or more additional illustrative embodiments, as may be combined with the preceding paragraphs, where forming a solution comprising (i) about 1 to about 40 wt. %, based on the total weight of the solution, of one or more waste plastic feedstocks and (ii) a recycled inert carrier fluid received from a refinery processing unit comprises dissolving the one or more waste plastic feedstocks in a recycled inert carrier fluid having a temperature above the melting point of the one or more waste plastic feedstocks.

In one or more additional illustrative embodiments, as may be combined with the preceding paragraphs, where forming a solution comprises forming a solution comprising (i) about 1 to about 20 wt. %, based on the total weight of the solution, of one or more waste plastic feedstocks and (ii) the recycled inert carrier fluid received from a refinery processing unit.

In one or more additional illustrative embodiments, as may be combined with the preceding paragraphs, where processing the solution comprising the one or more waste plastic feedstocks and the recycled inert carrier fluid in the presence of a catalyst under catalytic cracking conditions comprises passing the solution to a refinery fluid catalytic cracking unit, wherein the recycled inert carrier fluid has a conversation rate of less than about 40%.

In one or more additional illustrative embodiments, as may be combined with the preceding paragraphs, where the catalyst is an ECAT catalyst or a ZSM-5 catalyst.

According to an aspect of the present disclosure, a continuous process for transporting a waste plastic feedstock to a refinery processing unit comprises processing a first solution comprising (i) about 1 to about 40 wt. %, based on the total weight of the first solution, of one or more first waste plastic feedstocks and (ii) a recycled inert carrier fluid received from a refinery processing unit in the presence of a catalyst under catalytic cracking conditions, separating the recycled inert carrier fluid from the processed one or more first waste plastic feedstocks, and forming a second solution comprising (i) about 1 to about 40 wt. %, based on the total weight of the second solution, of one or more second waste plastic feedstocks and (ii) the separated recycled inert carrier fluid.

In one or more additional illustrative embodiments, as may be combined with the preceding paragraphs, the one or more first waste plastic feedstocks comprise one or more polyesters, one or more polyolefins and combinations thereof.

In one or more additional illustrative embodiments, as may be combined with the preceding paragraphs, the one or more first waste plastic feedstocks comprise one of a polyethylene or polypropylene waste plastic.

In one or more additional illustrative embodiments, as may be combined with the preceding paragraphs, the recycled inert carrier fluid is characterized as follows:
 having a total paraffin content of less than or equal to about 20 wt. %, and
 a total aromatics content of from about 50 wt. % to about 99 wt. %.

In one or more additional illustrative embodiments, as may be combined with the preceding paragraphs, the recycled inert carrier fluid is one or more of a light cycle oil, a heavy gasoline, a heavy reformate and a heavy heavy reformate.

In one or more additional illustrative embodiments, as may be combined with the preceding paragraphs, where the recycled inert carrier fluid has one of a conversion rate in a refinery processing unit of less than about 20% using a ZSM-5 catalyst and a conversion rate in a refinery processing unit of less than about 40% using an ECAT catalyst.

In one or more additional illustrative embodiments, as may be combined with the preceding paragraphs, where the process further comprises passing the second solution to the refinery processing unit, and processing the second solution in the presence of the catalyst under catalytic cracking conditions.

In one or more additional illustrative embodiments, as may be combined with the preceding paragraphs, where the processed one or more first waste plastic feedstocks produce hydrocarbon products with lower carbon footprint than a petroleum-based process.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present compositions and are disclosed herein just as if each and every such sub-combination was individually and explicitly disclosed herein.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A continuous process for transporting a waste plastic feedstock to a refinery processing unit, comprising:
 processing a first solution comprising (i) about 1 wt. % to about 40 wt. %, based on the total weight of the first solution, of one or more first waste plastic feedstocks and (ii) a recycled inert carrier fluid received from a refinery processing unit in the presence of a catalyst under catalytic cracking conditions, thereby producing a processed first solution;
 separating the recycled inert carrier fluid from the processed first solution, thereby producing a separated recycled inert carrier fluid; and
 forming a second solution comprising (i) about 1 to about 40 wt. %, based on the total weight of the second solution, of one or more second waste plastic feedstocks and (ii) the separated recycled inert carrier fluid.

2. The continuous process according to claim 1, wherein the one or more first waste plastic feedstocks comprise one or more polyesters, one or more polyolefins or combinations thereof.

3. The continuous process according to claim 1, wherein the one or more first waste plastic feedstocks comprise one of a polyethylene waste plastic or a polypropylene waste plastic.

4. The continuous process according to claim 1, wherein the recycled inert carrier fluid is characterized as follows:
   having a total paraffin content of less than or equal to about 20 wt. %; and
   a total aromatics content of from about 50 wt. % to about 99 wt. %.

5. The continuous process according to claim 1, wherein the recycled inert carrier fluid is one or more of a light cycle oil, a heavy gasoline, a heavy reformate and a heavy heavy reformate.

6. The continuous process according to claim 1, wherein the recycled inert carrier fluid has one of a conversion rate in the refinery processing unit of less than about 20% using a ZSM-5 catalyst or a conversion rate in the refinery processing unit of less than about 40% using an ECAT catalyst.

7. The continuous process according to claim 1, further comprising:
   passing the second solution to the refinery processing unit; and
   processing the second solution in the presence of the catalyst under catalytic cracking conditions.

8. The continuous process according to claim 1, wherein the processed first solution produces hydrocarbon products with a lower carbon footprint than a petroleum-based process.

9. The continuous process according to claim 1, wherein the one or more first waste plastic feedstocks and the one or more second waste plastic feedstocks each comprise one or more of a high-density polyethylene, a low-density polyethylene, a high molecular weight polyethylene, a low molecular weight polyethylene, polypropylene, polystyrene and combinations thereof.

10. The continuous process according to claim 1, wherein forming the first solution comprises dissolving the one or more first waste plastic feedstocks in the recycled inert carrier fluid having a temperature above the melting point of the one or more first waste plastic feedstocks.

11. The continuous process according to claim 1, wherein the first solution comprises (i) about 20 wt. % to about 40 wt. %, based on the total weight of the first solution, of the one or more first waste plastic feedstocks and (ii) the recycled inert carrier fluid received from the refinery processing unit.

12. The continuous process according to claim 1, wherein the first solution comprises (i) about 1 wt. % to about 20 wt. %, based on the total weight of the first solution, of the one or more first waste plastic feedstocks and (ii) the recycled inert carrier fluid received from the refinery processing unit.

13. The continuous process according to claim 1, wherein the catalyst is an ECAT catalyst or a ZSM-5 catalyst.

14. The continuous process according to claim 1, wherein the recycled inert carrier fluid has a conversion rate in the refinery processing unit of less than about 5% using a ZSM-5 catalyst.

15. The continuous process according to claim 14, wherein the recycled inert carrier fluid comprises a light cycle oil.

16. The continuous process according to claim 1, wherein the recycled inert carrier fluid has a conversion rate in the refinery processing unit of less than about 25% using an ECAT catalyst.

17. The continuous process according to claim 16, wherein the recycled inert carrier fluid comprises a light cycle oil.

18. The continuous process according to claim 1, wherein the processed first solution produces hydrocarbon products comprising a heavy cycle oil stream, and the continuous process further comprises delayed coking the heavy cycle oil stream under coking conditions, thereby producing an intermediate coke product; and calcining the intermediate coke product under calcinating conditions, thereby producing needle coke.

19. The continuous process according to claim 18, wherein delayed coking the heavy cycle oil comprises delayed coking the heavy cycle stream in the presence of an aromatic polymer material under coking conditions to obtain the intermediate coke product.

20. The continuous process according to claim 1, wherein the processed first solution produces hydrocarbon products comprising a gasoline fraction in an amount ranging from about 30 wt. % to about 60 wt. %, based on the total hydrocarbon products, as measured by ASTM D2887.

* * * * *